(12) United States Patent
Rieger et al.

(10) Patent No.: US 11,219,855 B2
(45) Date of Patent: Jan. 11, 2022

(54) FILTER MODULE COMPRISING A FILTER ELEMENT IN A FILTER HOUSING

(71) Applicant: MANN+HUMMEL GmbH, Ludwigsburg (DE)

(72) Inventors: Mario Rieger, Ludwigsburg (DE); Pedro Miguel Pereira Madeira, Bietigheim-Bissingen (DE); Stefan Kunze, Tuebingen (DE); Ulrich Dehnen, Kornwestheim (DE); Johannes Stuerner, Aidlingen (DE); Markus Beylich, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/935,635

(22) Filed: Jul. 22, 2020

(65) Prior Publication Data

US 2020/0346160 A1 Nov. 5, 2020

Related U.S. Application Data

(63) Continuation of application No. PCT/EP2019/050167, filed on Jan. 4, 2019.

(51) Int. Cl.
*B01D 50/00* (2006.01)
*B01D 45/16* (2006.01)
(Continued)

(52) U.S. Cl.
CPC .......... *B01D 50/002* (2013.01); *B01D 45/16* (2013.01); *B01D 46/0005* (2013.01);
(Continued)

(58) Field of Classification Search
CPC .. B01D 50/002; B01D 45/16; B01D 46/0005; B01D 46/0043; B01D 46/2403; B01D 2275/208; B01D 2279/60; B01D 2265/024; B01D 2265/026; B01D 46/2414; B01D 46/0046; Y02T 10/12; F02M 35/02483;
(Continued)

(56) References Cited

U.S. PATENT DOCUMENTS 2,720,278 A * 10/1955 Wiley ................ B01D 46/0031
55/318
2,942,691 A * 6/1960 Dillon ..................... F04B 39/16
55/426

(Continued)

FOREIGN PATENT DOCUMENTS

WO 2009106594 A1 9/2009

*Primary Examiner* — Dung H Bui

(57) ABSTRACT

A filter module is provided with a filter housing provided with an inflow opening. A filter element with an annular filter medium body with␣an elongate cross-sectional shape is arranged inside the filter housing. A flow path is defined between the inflow opening of the filter housing and an inflow side of the filter medium body. A swirl device is arranged in the flow path and impresses a swirl onto an incoming fluid. The swirl device is a part separate from an outer wall of the filter housing. The swirl device is arranged axially upstream of the inflow side of the filter medium body. The swirl device is provided with a displacement body arranged inside the filter housing adjacent to the inflow opening. The displacement body forms a flow guiding element.

8 Claims, 7 Drawing Sheets

(51) Int. Cl.
*B01D 46/00* (2006.01)
*B01D 46/24* (2006.01)

(52) U.S. Cl.
CPC ..... *B01D 46/0043* (2013.01); *B01D 46/2403* (2013.01); *B01D 2275/208* (2013.01); *B01D 2279/60* (2013.01)

(58) Field of Classification Search
CPC ......... F02M 35/10013; F02M 35/0201; F02M 35/0204
See application file for complete search history.

(56) References Cited

U.S. PATENT DOCUMENTS

| | | | | |
|---|---|---|---|---|
| 3,078,650 | A * | 2/1963 | Anderson | B01D 46/2411 55/337 |
| 3,429,108 | A * | 2/1969 | Larson | B01D 46/24 55/432 |
| 3,584,439 | A * | 6/1971 | Gronholz | B01D 29/908 55/337 |
| 4,006,000 | A * | 2/1977 | Tortorici | B01D 46/2411 55/323 |
| 4,135,899 | A * | 1/1979 | Gauer | B01D 46/0024 210/338 |
| 4,162,905 | A * | 7/1979 | Schuler | B01D 45/16 55/337 |
| 5,509,948 | A * | 4/1996 | Keller | B01D 50/002 55/337 |
| 6,423,225 | B2 * | 7/2002 | Wong | B01D 27/08 210/304 |
| 6,833,023 | B1 * | 12/2004 | Vandenberghe | B01D 29/906 55/337 |
| 6,843,377 | B1 * | 1/2005 | Roll | B01D 29/21 210/437 |
| 7,232,035 | B1 * | 6/2007 | Crawford | B01D 27/00 210/456 |
| 2007/0251199 | A1 | 11/2007 | Valentini | |
| 2013/0025557 | A1 * | 1/2013 | Chlystek | F02M 35/164 123/184.21 |
| 2013/0074461 | A1 * | 3/2013 | Sisk | B01D 46/0046 55/476 |
| 2014/0083299 | A1 * | 3/2014 | Yamase | B01D 46/24 96/416 |
| 2014/0130467 | A1 * | 5/2014 | Herman | B01D 46/125 55/414 |
| 2015/0068169 | A1 * | 3/2015 | Schulz | B01D 45/12 55/337 |
| 2015/0082982 | A1 | 3/2015 | Ruhland et al. | |
| 2016/0296869 | A1 | 10/2016 | Stark et al. | |
| 2017/0319027 | A1 * | 11/2017 | Hyun | A47L 9/1608 |
| 2018/0036746 | A1 * | 2/2018 | Antomon | B04C 5/08 |
| 2018/0169553 | A1 * | 6/2018 | Billiet | B01D 45/16 |
| 2018/0245548 | A1 * | 8/2018 | Varghese | B01D 46/0002 |

* cited by examiner

FILTER MODULE COMPRISING A FILTER ELEMENT IN A FILTER HOUSING

CROSS-REFERENCE TO RELATED APPLICATIONS

This application is a continuation application of international application No. PCT/EP2019/050167 having an international filing date of 4 Jan. 2019 and designating the United States, the international application claiming a priority date of 24 Jan. 2018 based on prior filed German patent application No. 10 2018 000 541.1, the entire contents of the aforesaid international application and the aforesaid German patent application being incorporated herein by reference.

BACKGROUND OF THE INVENTION

The invention concerns a filter module with a filter element in a filter housing, wherein the filter element comprises an annular filter medium body with elongate cross-sectional shape.

U.S. Pat. No. 3,816,982 describes an air filter with a hollow-cylindrical filter element in a receiving filter housing. The air to be filtered is introduced via an inflow opening, arranged laterally in the filter housing and axially upstream of the filter element, and flows subsequently through the filter element in radial direction from the exterior to the interior. The filter element comprises at its oppositely positioned end faces an open and a closed end disk. The purified air is discharged axially from the inwardly positioned flow space of the hollow-cylindrical filter element via the open end disk.

DE 10 2011 011 595 A1 discloses an air filter with a filter element in a filter housing, wherein the filter element comprises an annular circumferentially extending filter medium body with elongate cross-sectional shape. The filter medium body comprises an inwardly positioned flow space into which the raw fluid to be purified is axially introduced. Subsequently, the filter medium body is flowed through by the fluid in radial direction from the interior to the exterior.

DE 20 2007 004 476 U1 discloses a filter module for purifying a fluid with a filter element arranged in a filter housing that has arranged upstream thereof a cyclone pre-separator by means of which the fluid can be supplied to the filter element. The cyclone pre-separator comprises two cyclone cells with different diameter.

SUMMARY OF THE INVENTION

It is the object of the invention to configure a filter module with a filter element that comprises an annular filter medium body with elongate cross-sectional shape with simple constructive measures in such a way that dirt particles are separated from the fluid flow to be filtered prior to flowing through the filter medium body.

This object is solved according to the invention in that, in the flow path between an inflow opening in the filter housing and the inflow side of the filter medium body, a swirl device embodied separate from the outer wall of the filter housing is arranged in order to impress a swirl onto the incoming fluid, wherein the swirl device is arranged axially upstream of the inflow side of the filter medium body, wherein the swirl device comprises a displacement body which is arranged within the filter housing adjacent to the inflow opening, wherein the displacement body forms a flow guiding element.

The dependent claims provide expedient further embodiments.

The filter module according to the invention comprises a filter housing and a filter element received in the filter housing at which the filtration of a fluid to be purified takes place. The filter element is embodied annular and comprises an annular filter medium body that is flowed through by the fluid during filtration, wherein the filter medium body is embodied in particular in an annular closed configuration and comprises an inwardly positioned flow space for receiving the fluid. Advantageously, the annular filter medium body is flowed through by the fluid to be purified in radial direction from the exterior to the interior so that the inwardly positioned flow space is located at the clean side of the filter medium body and the exterior side of the filter medium body is the raw side or the inflow side. In principle, however, also the reverse flow direction through the filter medium body radially from the interior to the exterior is conceivable.

The fluid is in particular a gaseous fluid, for example, combustion air to be supplied to the cylinders of an internal combustion engine. Moreover, a use for liquid fluids is possible also.

The fluid is guided via an inflow opening that is located in the filter housing in the direction toward the filter element and the filter medium body. In the flow path between the inflow opening in the filter housing and the inflow side of the filter medium body, a swirl device is arranged which is embodied to imprint a swirl to the inflowing fluid. Relative to the longitudinal axis of the annular filter element, the inflow opening and the swirl device are arranged axially upstream of the inflow side of the filter medium body. Expediently, the inflow opening has a larger axial distance to the inflow side of the filter medium body than the swirl device.

The swirl device can be embodied separate from the outer housing wall of the filter housing and form a component that is embodied separate from the outer wall of the filter housing. The swirl device delimits, together with the outer wall of the filter housing, a flow path for the fluid after entry through the inflow opening into the filter housing.

Due to the swirl that is imparted to the incoming fluid even before reaching the inflow side of the filter medium body, dirt particles that are entrained in the fluid are guided outwardly in the direction toward the inner side of the outer wall of the filter housing and can be separated prior to reaching the inflow side of the filter medium body. Thus, a pre-separation of dirt particles that are entrained in the fluid takes place. The separated dirt particles, as needed, can be discharged from the filter housing via a device embodied for this purpose.

The swirl device as a component that is embodied separate from the outer wall of the filter housing has the additional advantage that the inflow opening can be positioned at different positions of the filter housing and that the inflowing fluid can be imparted with a swirl from any of these positions. This expands on the constructive possibilities in regard to positioning of the inflow opening.

By means of the swirl device, in particular the flow cross section of the flow path for the incoming fluid is narrowed so that a flow acceleration takes place. Entrained dirt particles in the fluid can be better separated by a higher flow rate in swirl separation or centrifugal separation.

Different embodiments of the swirl device are conceivable. According to an advantageous embodiment, the swirl device is arranged at the filter element, for example, at a support grid which is positioned at the clean side of the filter element or at an end disk of the filter element that is located at the end face of the filter medium body. In a further embodiment, it is provided, on the other hand, that the swirl device is connected to the filter housing and optionally is embodied as one piece together with the filter housing. The swirl device is located, for example, at an inlet housing which is part of the filter housing and is attachable to a filter base housing in which the filter element is received. In this embodiment, the swirl device forms a fixed component of the inlet housing but the swirl device is embodied separate from the outer wall of the inlet housing.

In a further advantageous embodiment, the swirl device is located at the filter base housing which receives the filter element.

Independent of its constructive embodiment and correlation to a component of the filter module, the swirl device is arranged axially upstream of the inflow side of the filter medium body. Accordingly, the separation of the dirt particles in the fluid is taking place also in a region which is axially upstream of the inflow side of the filter medium body. This has the advantage that a separation of most dirt particles from the fluid flow has been achieved when it reaches the inflow side of the filter medium body.

The filter medium body comprises an elongate cross-sectional shape and comprises longitudinal sides and narrow sides by means of which the two longitudinal sides are connected so that the inwardly positioned flow space is enclosed by the longitudinal sides and narrow sides of the filter medium body.

The cross-sectional shape of the filter medium body can be oval or ovalized. However, also non-oval elongate cross-sectional shapes are conceivable, for example, concavely curved longitudinal sides or straight-surfaced, flat longitudinal sides or non-oval curved convex longitudinal sides. The extension of the longitudinal sides is larger than the extension of the narrow sides; for example, it can be expedient that the extension of the longitudinal sides is at least twice as large as the extension of the narrow sides. The narrow sides are provided, for example, with a semi-circular cross-sectional shape.

The elongate cross-sectional shape of the filter medium body or of the filter element has the advantage that installation spaces that are of a relatively low height can be used for the filter module. Also, a large inflow surface is provided at the longitudinal sides of the filter medium body at which identical or at least similar flow conditions are present.

The filter element and the filter medium body can have across their axial length, relative to the longitudinal axis of the filter element, a non-constant cross section that changes from one end face to the oppositely positioned end face. For example, the cross section increases from the closed end disk to the oppositely positioned open end disk.

As an alternative to a non-constant cross section, also filter elements or filter medium bodies with a constant cross section across the length are possible.

According to a further expedient embodiment, the swirl device is embodied as a displacement body that is arranged inside the filter housing adjacent to the inflow opening. The displacement body forms of flow guiding element for the fluid introduced into the filter housing. The displacement body reduces the free volume available for the fluid and forces the incoming fluid into a predetermined flow path toward the inflow side of the filter medium body. The flow path is preferably embodied in a curved configuration. This is in particular achieved in that the displacement body is embodied in a curved configuration in the direction toward a flow passage that is located between an end face of the filter medium body and a housing wall of the filter housing.

This curvature of the displacement body forms the inner wall delimiting the flow path along which the fluid is moving in the direction toward the filter medium body. The outer wall of the flow path that is also curved is preferably formed by the inner side of the outer wall of the housing part that receives the displacement body. Due to the curvature, the fluid experiences a desired swirl which assist in separation of the dirt particles.

Fastening elements can be arranged at the displacement body which, for fixation of the displacement body, engage, in particular in form-fit and/or friction-fit engagement, additional fastening elements which are arranged at an end disk of the filter element, for example.

According to yet another expedient embodiment, the swirl device is embodied as one or a plurality of guiding ribs that are arranged in a flow passage between an end face of the filter medium body and the housing wall of the filter housing. The end face of the filter medium body is preferably closed flow-tightly by an end disk wherein the guiding ribs extend at the end disk radially outwardly in the direction toward the inner side of the surrounding housing wall of the filter housing. The fluid that is introduced into the filter module must pass through the flow passage in order to reach the raw side of the filter medium body wherein, upon flow through the flow passage, the guiding ribs impart a swirl to the fluid.

The guiding ribs are preferably arranged at the filter element, for example, at the end disk at the end face of the filter medium body or embodied as one piece together with a support frame in the filter element. In an alternative embodiment, the guiding ribs are arranged at the filter housing, in particular fastened to the inner side of the housing wall of the filter housing.

The guiding ribs are, for example, embodied as curved guide vanes. They can be arranged in addition to or as an alternative to the displacement body.

In a further advantageous embodiment, the filter medium body is of a folded configuration wherein the longitudinal extension of the filter folds extends in axial direction, relative to the longitudinal axis of the filter element.

According to an advantageous embodiment, at the inflow side of the filter medium body a flow-tight separation element is provided which extends across a partial surface of the filter medium body. The flow-tight separation element prevents or reduces at least an inflow into the filter medium body in this section so that a flow calming action of the raw fluid at the inflow side of the filter medium body is achieved.

The separation element is embodied, for example, as a calming wall or as a separation film and prevents that the fluid to be purified flows at the inflow side at the position of the separation element immediately through the filter medium body. The unpurified raw fluid guided in the direction toward the inflow side is prevented from immediately flowing through the filter medium body at the position of the separation element and is therefore forced to reside in the space at the inflow side of the filter medium body for at least a slightly longer period of time, which entails a flow calming action. Subsequent thereto, the unpurified fluid can flow through the filter medium body. The flow calming action has the result that larger dirt particles entrained in the raw fluid can deposit in the space that is upstream of the inflow side of the filter medium body. Therefore, a pre-separation is taking place wherein the separated particles advantageously can be discharged via a discharge valve from the filter housing. Due to the pre-separation, the dirt load of the filter medium body is reduced.

According to an advantageous embodiment, the separation element is located at the filter housing in which the filter element with the filter medium body is received. The separation element can be embodied, as needed, as one piece together with the filter housing. For example, the separation element is a calming wall which surrounds the filter medium body in a ring shape and comprises a distance relative to the outer side of the filter medium body.

According to a further advantageous embodiment, the separation element is arranged immediately at the filter element, for example, is applied to the outer side of the filter medium body. For example, the separation element is a separation film which is applied immediately onto the outer side of the filter medium body. In the region of the separation film, no immediate radial inflow into the filter medium body is possible. In a folded configuration of the filter medium body, the separation film is resting on the outer edges of the filter folds, wherein spreading of raw fluid at the inflow side is possible along the longitudinal extension of the filter folds. In this way, raw fluid which radially enters at a location of the filter medium body without such a separation film can be guided along the longitudinal extension of the folds axially to the region in which the separation film is located whereupon the filter medium body is radially flowed through in this section also. In this way, the section of the filter medium body which is covered by the separation film can also be used for filtration.

In a further advantageous embodiment, it is possible to provide a separation element in the form of a housing-associated calming wall as well as a further separation element in the form of a filter element-associated separation film. These two separation elements are located in particular at axially oppositely positioned sides of the filter medium body of the filter element.

In any case, it is expedient that the separation element, or the sum of all separation elements, extends only across a partial surface at the inflow side of the filter medium body so that a further partial section at the inflow side of the filter medium body remains free of such a separation element.

According to yet another advantageous embodiment, the separation element extends, beginning at an axial end face of the filter medium body, in axial direction as well as completely in circumferential direction of the filter medium body. The axial extension of the calming element is however in any case less than the axial total length of the filter medium body so that a partial section of the filter medium body remains free of the separation element. Advantageously, the axial extension of a separation element is maximally as large as half the axial total length of the filter medium body, for example, maximally only as large as a third of the axial total length of the filter medium body.

In case of a separation film as a separation element, it is expedient that the separation film is connected fixedly to the filter medium body, for example, by gluing or by welding.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
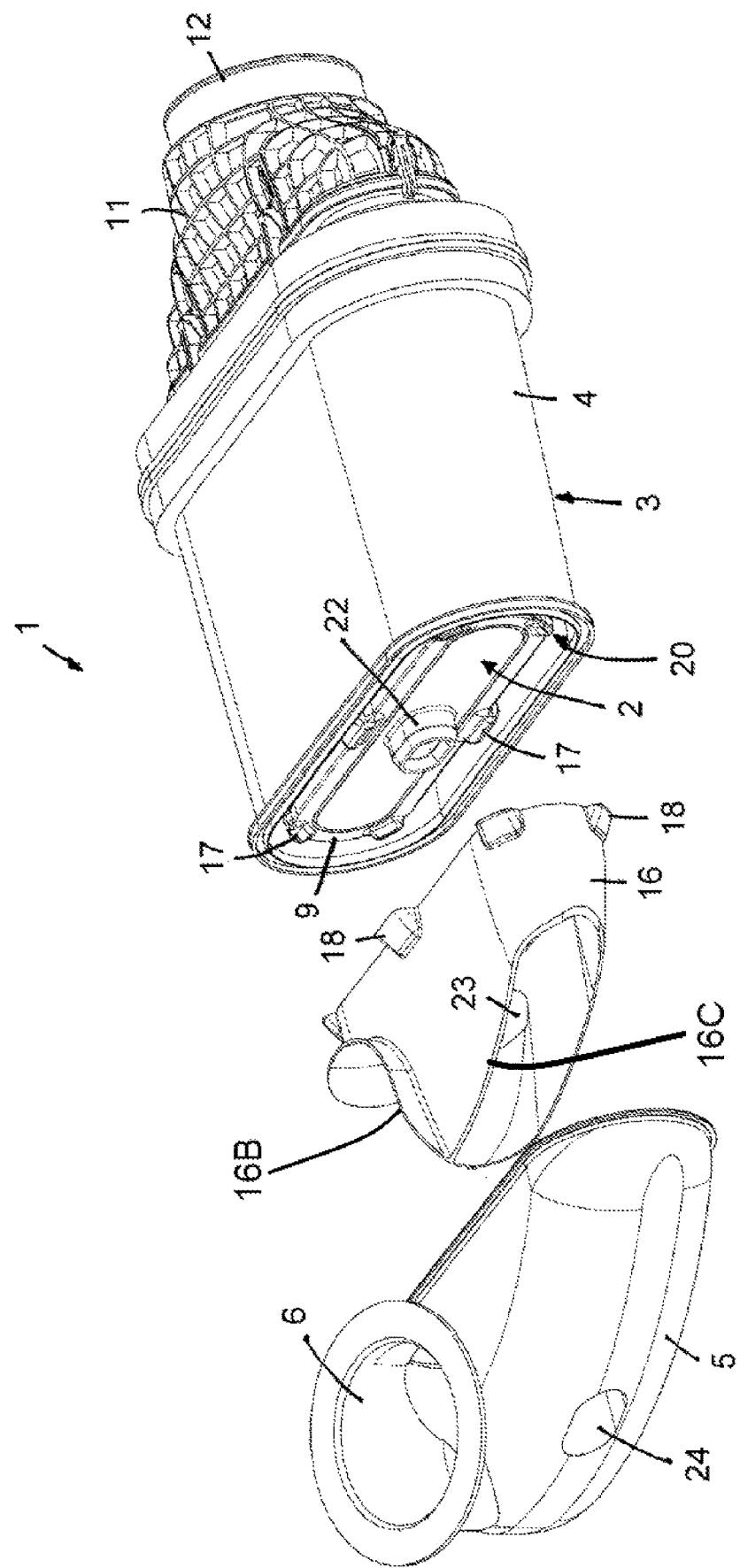
FIG. 1 shows in exploded illustration a filter module as air filter for an internal combustion engine with a filter element with elongate cross-sectional shape in a filter housing, with a displacement body which is arranged in the filter housing adjacent to an inflow opening.
Figure 2:
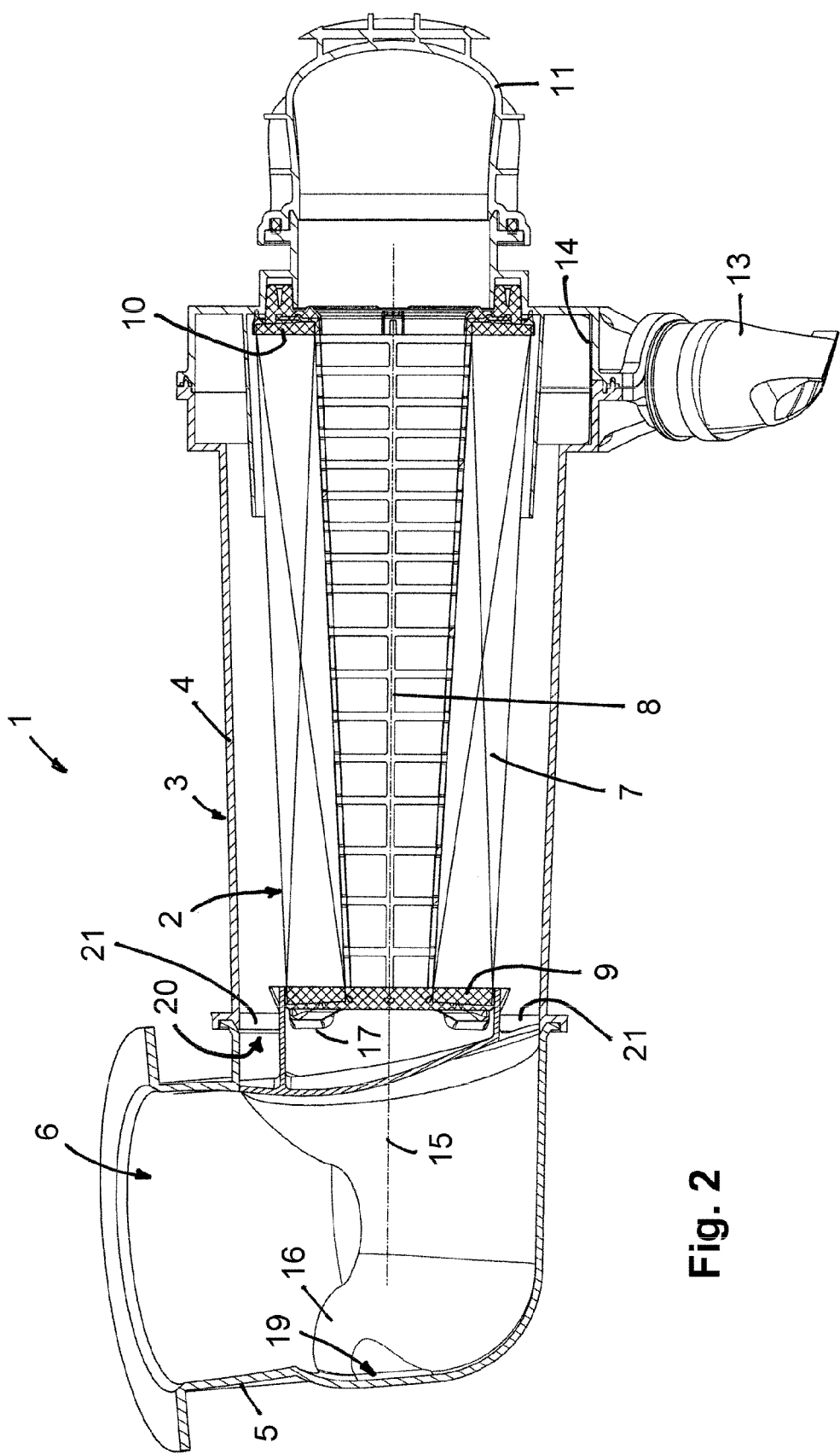
FIG. 2 shows a section lengthwise through the filter module in a first section plane.
Figure 3:
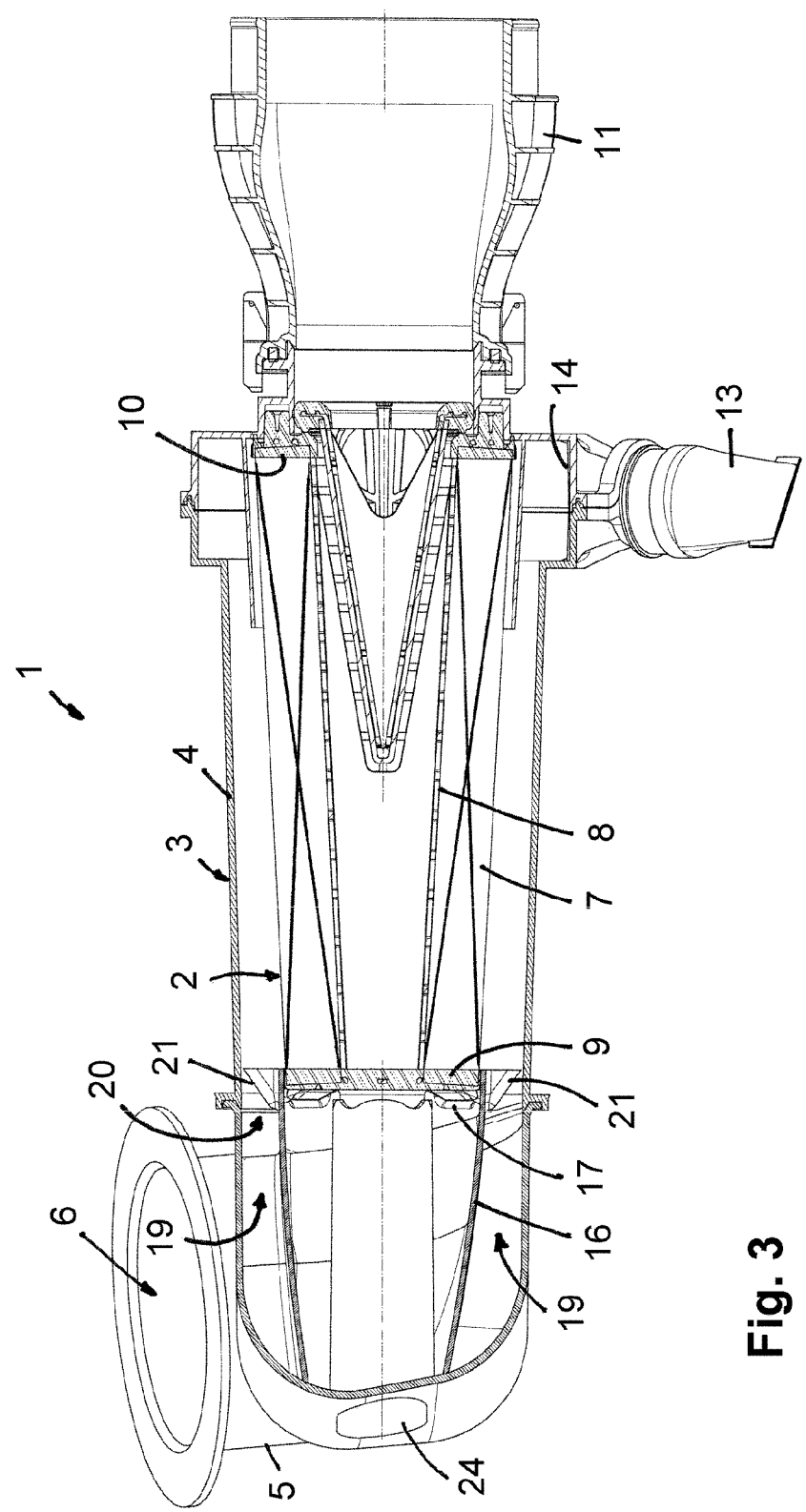
FIG. 3 shows a section lengthwise through the filter module in a further section plane.
Figure 4:
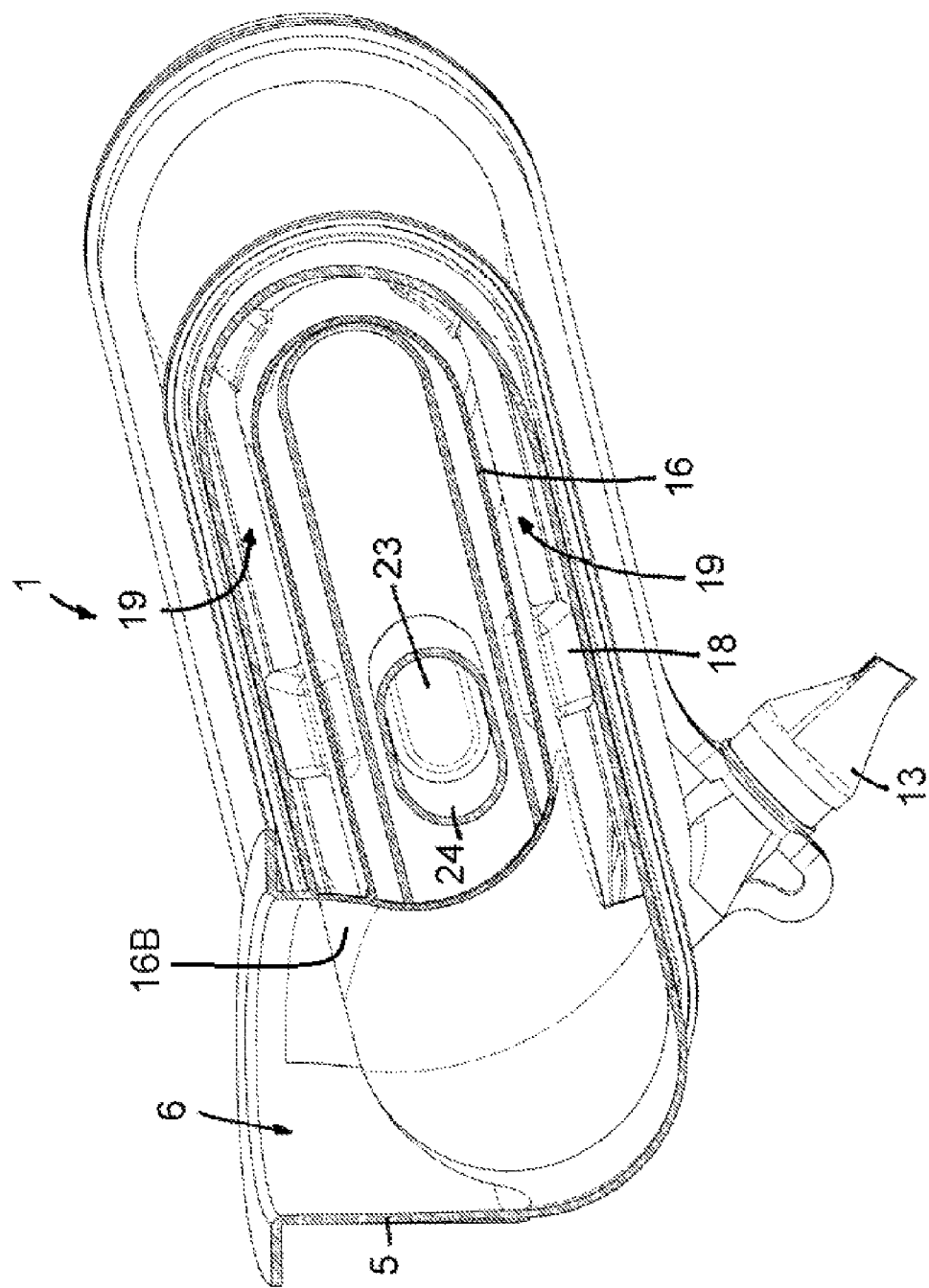
FIG. 4 is a further illustration of the air filter, partially in section.

In the first embodiment according to FIGS. 1 through 4, a filter module 1 is illustrated that is embodied as an air filter in the intake manifold of an internal combustion engine for filtration of the combustion air to be supplied to the cylinders of the internal combustion engine. The filter module 1 comprises a filter element 2 that has an elongate cross-sectional shape and is arranged in a filter housing 3 with a filter base housing 4 and an upstream inlet housing 5. The filter base housing 4 accommodates the filter element 2. In the inlet housing 5 that is to be connected to the filter base housing 4, a laterally arranged inflow opening 6 which opens into an inflow duct (at 6, see FIG. 1) via which the combustion air is introduced into the filter housing 3 and guided in the direction toward the filter element 2. Relative to a central longitudinal axis 15 of the filter element 2, the inflow opening 6 is displaced laterally or radially wherein the inflow axis of the inflow opening 6 is positioned at an angle of approximately 90° relative to the central longitudinal axis 15 of the filter element 2.

The filter element 2 comprises a filter medium body 7 which is embodied in an annular closed configuration and provided with an elongate cross-sectional shape. Relative to the central longitudinal axis 15, the filter medium body 7 is flowed through in radial direction from the exterior to the interior by the fluid to be filtered, the combustion air, so that the outer side of the filter medium body 7 forms the raw side or inflow side and the inner side the clean side. The filter medium body 7 is lined at its inner or clean side by a support frame 8 which is comprised of plastic material. The inwardly positioned flow space in the filter medium body 7 forms the clean space in which the purified fluid is collected and from which the purified fluid is axially discharged.

At the two oppositely positioned end faces of the filter element 2, an end disk 9, 10 is arranged, respectively, wherein the first end disk 9 neighboring the inflow opening 6 is embodied in a closed configuration and the second oppositely positioned end disk 10 facing away from the inflow opening 6 is embodied in an open configuration so that the fluid can flow axially out of the inwardly positioned clean space via the open end disk 10. Adjacent to the open end disk 10 of the filter element 2, a housing-associated outlet section 11 adjoins the filter base housing 4 and comprises an outflow opening 12 (FIG. 1) via which the purified fluid is discharged from the filter module 1.

The cross-sectional shape of the filter element 2 or of the filter medium body 7 is elongate wherein the longitudinal sides extend planar and parallel to each other and are connected by curved narrow sides. The extension of the longitudinal sides is at least twice as large as the distance bridged by the narrow sides, i.e., the distance between the two longitudinal sides. Across the axial length, relative to the central longitudinal axis 15, the filter element 2 and the filter medium body 7 have a non-constant cross section which in the region of the closed end disk 9 is smaller than in the oppositely positioned region with the open end disk 10 and increases continuously and uniformly from the smaller to the larger cross section.

Adjacent to the housing-associated outlet section 11, the filter base housing 4 is provided with a radially expanded annular space 14 at which a discharge valve 13 is arranged. In the radially expanded annular space 14, separated dirt particles can collect which can be discharged through the discharge valve 13 from the filter housing.

A displacement body 16 which is annular (see FIG. 1) is inserted in the inlet housing 5 and significantly reduces the free volume that is available in the inlet housing 5 for receiving the introduced fluid and, at the same time, forms a defined flow path for the fluid in the direction toward the filter element 2 with the filter medium body 7. The displacement body 16 is fastened in the inlet housing 5 and preferably comprises receptacles for the filter element 2 that receive the filter element 2, preferably its closed end disk 9, in a detachable way. For this purpose, at the outer circumference of the end disk 9, distributed about the circumference, a plurality of fastening elements 17 formed as projections (see FIG. 1) are arranged that have correlated therewith corresponding fastening receptacles 18 at the displacement body 16. The fastening elements 17 and receptacles 18 are to be brought into fastening engagement in order to center the displacement body 16 and the filter element 2 relative to each other.

The displacement body 16 is dimensioned such that between the outer side of the displacement body 16 and the inner side of the outer housing wall of the inlet housing 5 a flow path 19 (FIG. 3) is formed for the fluid which is introduced via the inflow opening 6. The outer contour of the displacement body 16 has an annular axial edge contour (16C, see FIG. 1) having a geometry that follows and contacts against the inner contour of the inlet housing 5 such that an interior of the displacement body (16) is closed off by the first end disk (9) and by the inner contour of the inlet housing 5. Both contours are embodied in a curved configuration so that the flow path 19 is also correspondingly curved. The flow path 19 extends in the direction toward a flow passage 20 which is formed between the end face of the filter medium body 7 with the end disk 9 and the housing wall of the filter housing 3. This flow passage 20 extends all around circumferentially and enables passage of the introduced fluid to the raw or inflow side of the filter medium body 7 in the filter base housing 4. The displacement body 16 as well as the inlet housing 5 are arranged axially upstream of the filter element 2 in the flow direction.

The fluid which is laterally introduced via the inflow opening 6 flows into the flow path 19 between displacement body 16 and inlet housing 5 and, due to the curvature of the flow path 19, is imparted with a swirl that leads to the separation of dirt particles. In addition, in comparison to the inflow opening 6, the flow path 19 has a reduced flow cross section so that the introduced fluid is accelerated. The increased speed of the fluid and of the dirt particles entrained therein improves the degree of separation.

At the outer side of the closed end disk 9, a centrally positioned support sleeve 22 is integrally formed with which the filter element 2 can be axially supported from the exterior. For this purpose, the inlet housing 5 is provided with a recess 24 which is axially aligned with the support sleeve 22 and serves as a support for the support sleeve 22.

The displacement body 16 comprises an outer contour that is smaller than the inner contour of the receiving inlet housing 5. In this way, at a plurality of sides, preferably all around at all sides, between the outer wall of the displacement body 16 and the inner side of the housing wall of the inlet housing 5 a flow path is provided which extends from the inlet opening 6 in the inlet housing 5 to the flow passage 20 in the region of the closed end disk 9 of the filter element 2. This flow path 19 has a curvature in all directions so that the inflowing fluid is imparted correspondingly with a swirl in all directions and with this swirl enters the annular circumferentially extending flow passage 20 in which the guiding ribs 21 are arranged.

In the flow passage 20, a plurality of guiding ribs 21 are arranged and distributed about the circumference; they form flow vanes and further accelerate the flow in the direction toward the filter medium body 7. Stated more precisely, the initial swirl which has been generated by the displacement body 16 and the housing inner wall is absorbed and further amplified. In this way, the degree of separation can also be further improved. The guiding ribs 21 can be arranged at the filter housing 3, in particular the filter base housing 4. Conceivable is also an arrangement of the guiding ribs 21 at the filter element 2, in particular at the closed end disk 9.

Figure 5:
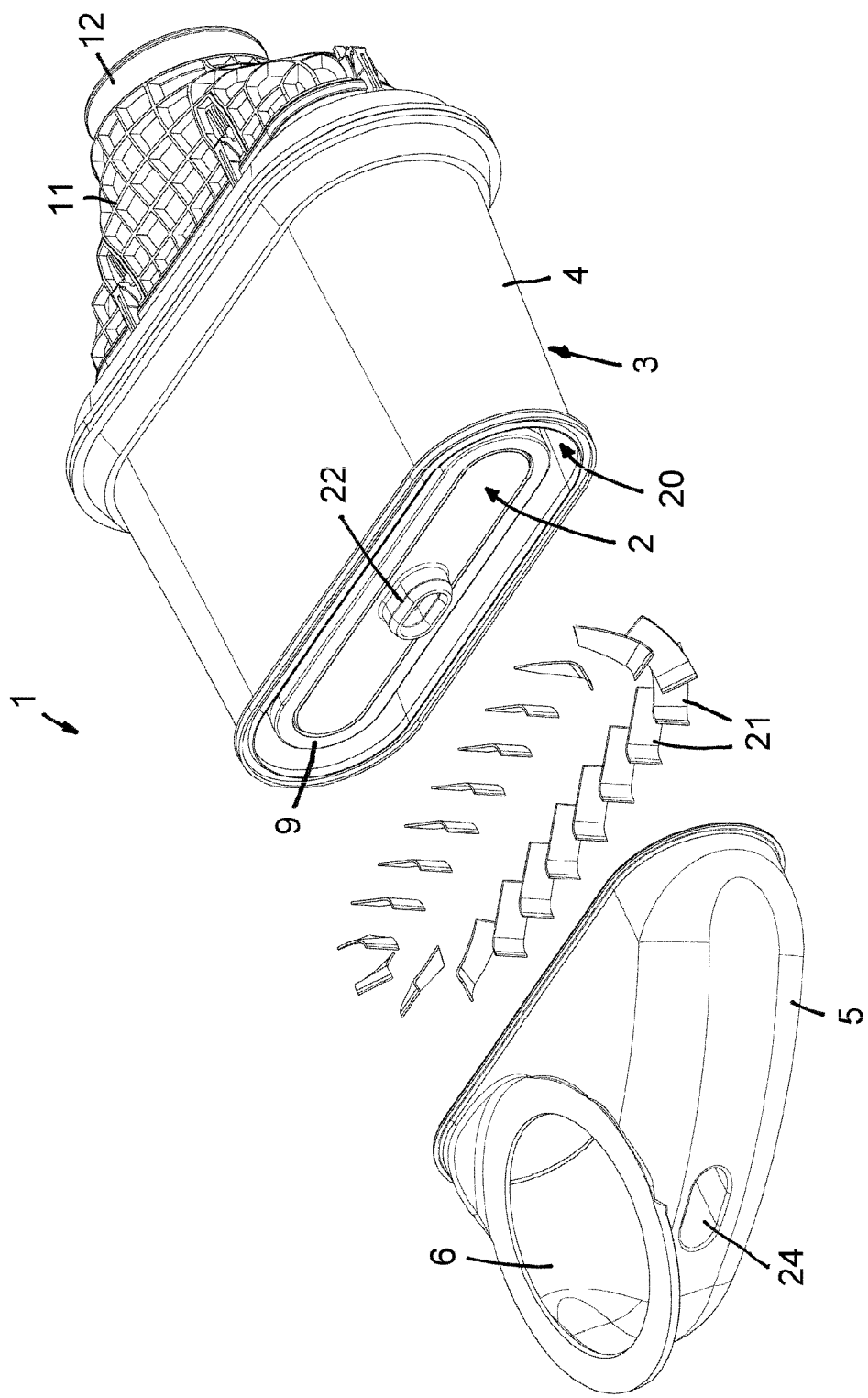
FIG. 5 shows a further embodiment of a filter module that is embodied as an air filter, with guide vanes in the flow path between an inflow opening in the filter housing and the filter element, in exploded view.
Figure 6:
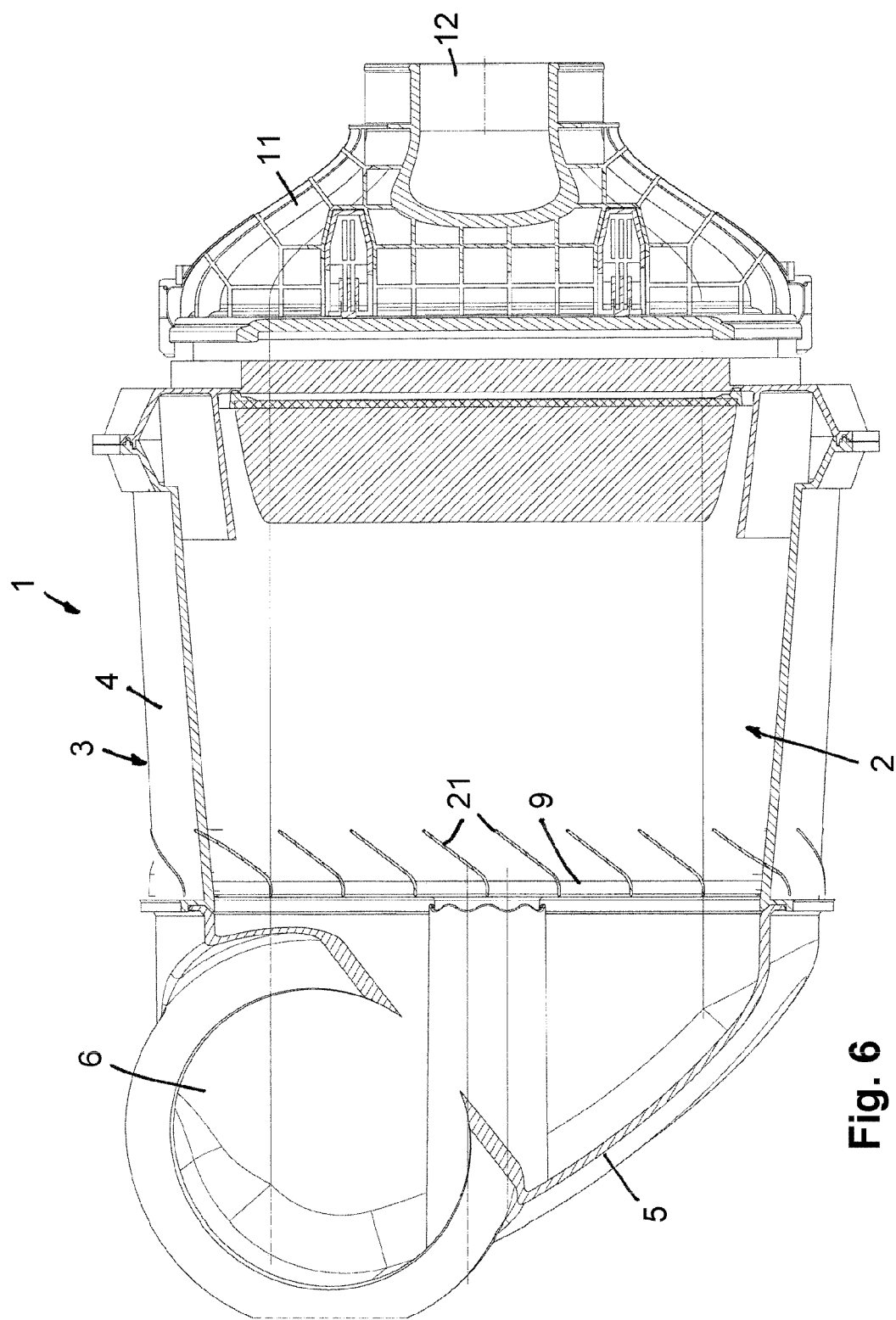
FIG. 6 shows the embodiment of FIG. 5 in longitudinal section.

In FIGS. 5 and 6, a further embodiment of a filter module 1 is illustrated which forms an air filter for the intake manifold of an internal combustion engine. The basic configuration of the air filter 1 and the cross-sectional geometry of the filter element 2 correspond to that of the first embodiment. In contrast to the first embodiment, the displacement body in the inlet housing 5 is missing in FIGS. 5 and 6. Accordingly, the combustion air entering via the inlet opening 6 can expand in the complete interior in the inlet housing 5 and flow in the direction toward the flow passage 20 located between the outer circumference of the closed end disk 9 at the filter medium body 7 and the inner side of the housing wall of the filter base housing 4.

In the flow passage 20, guiding ribs 21 are arranged which are embodied partially as curved guiding vanes 21 and partially have straight sections. The guiding vanes 21 form a swirl device for the combustion air flowing through. Distributed about the circumference, a plurality of such guiding vanes 21 are arranged in the flow passage 20. The guiding vanes 21 are fastened in particular at the filter element 2. In an alternative embodiment, it is also possible to fasten the guiding vanes 21 at a housing part, for example, at the filter base housing 4 or at the inlet housing 5.

Figure 7:
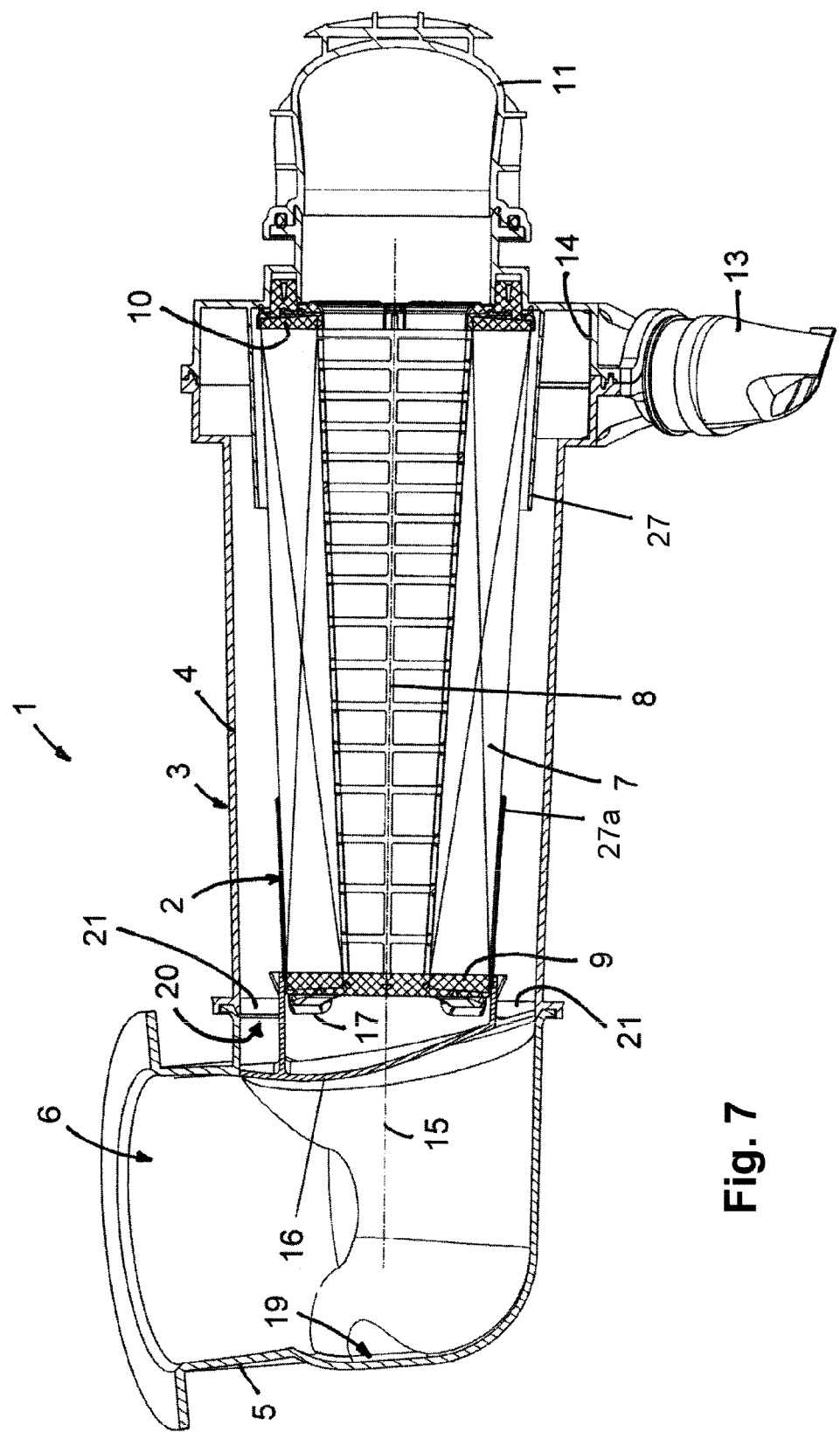
FIG. 7 shows a filter module embodied as air filter in an illustration according to FIG. 2 in an embodiment variant.

In FIG. 7, an embodiment variant of a filter module 1 embodied as an air filter is illustrated. The basic configuration corresponds to that of FIGS. 1 to 4.

The filter module 1 according to FIG. 7 comprises a filter element 2 which is embodied hollow cylindrically or with elongate cross-sectional shape and arranged in a filter housing 3 which comprises a filter base housing 4 and an upstream inlet housing 5. The filter base housing 4 and the inlet housing 5 at which an inflow opening 6 is located are of a one-piece configuration. The filter base housing 4 accommodates the filter element 2 in its receiving space 26. The combustion air to be filtered is introduced via the laterally arranged inflow opening 6 into the filter housing 3 and guided in the direction toward the filter element 2. Relative to the central longitudinal axis 15 of the filter element 2, the inflow opening 6 is positioned laterally or radially displaced wherein the inflow axis of the inflow opening 6 is positioned at an angle of approximately 90° relative to the central longitudinal axis 15 of the filter element 2.

The filter element 2 comprises a filter medium body 7 which is embodied in an annular closed embodiment and provided with an elongate cross-sectional shape. Relative to its central longitudinal axis 15, the filter medium body 7 is flowed through in radial direction from the exterior to the interior by the fluid to be filtered, the combustion air, so that the outer side of the filter medium body 7 forms the raw or inflow side and the inner side the clean side. The filter medium body 7 is lined at its inner or clean side by a support frame 8 which is comprised of plastic material. The inwardly positioned flow space in the filter medium body 7 forms the clean space in which the purified fluid is collected and from which the purified fluid is axially discharged.

At both oppositely positioned end faces of the filter medium body 7, an end disk 9, 10 is arranged, respectively, wherein the first end disk 9 neighboring the inflow opening 6 is embodied in a closed configuration and the second oppositely positioned end disk 10 facing away from the inflow opening 6 is embodied in an open configuration so that the fluid can flow axially out of the inwardly positioned clean space via the open end disk 10. Adjacent to the open end disk 10 of the filter element 2, a housing-associated outlet section 11 adjoins the filter base housing 4 and comprises an outflow opening 12 via which the purified fluid is discharged from the filter module 1. The outlet section 11 is embodied separate from the filter base housing 4 but is connected to the filter base housing 4.

The cross-sectional shape of the filter element 2 or of the filter medium body 7 can be embodied elongate wherein the longitudinal sides in an exemplary fashion extend planar and parallel to each other and are connected by curved narrow sides. However, a circular cross-sectional shape of the filter element 2 and of the filter medium body 7 is also possible.

The filter element 2 and the filter medium body 7 have across the axial length, relative to the central longitudinal axis 15, a non-constant cross section that is smaller in the region of the closed end disk 9 than in the oppositely positioned region with the open end disk 10 and increases continuously and uniformly from the smaller to the larger cross section.

Adjacent to the housing-associated outlet section 11, in the filter base housing 4 a radially expanded annular space 14 is provided which forms a dirt collecting region and at which a discharge valve 13 is arranged. In the radially expanded dirt collecting region 14 which is of an annular embodiment, the separated dirt particles can collect which can be discharged via the discharge valve 13 from the filter housing 3.

The discharge valve 13 is preferably embodied as a passive valve that can be adjusted by external influences from the usually closed position into an open position in which the dirt particles can be discharged. For example, it is possible to connect the discharge valve 13 to a vacuum source, e.g., to a vacuum side of a cooling fan in a vehicle, so that the discharge valve 13 is opened at sufficiently high vacuum.

The dirt collecting region 14 communicates with the receiving space 26 at the raw or inflow side of the filter medium body 7. The dirt collecting region 14 is located axially adjacent to the open end disk 10 at the outflow side of the filter element 2. Relative to the axial total length of the filter element 2, the dirt collecting region 14 extends across an axial partial length that amounts to not more than 20% of the total length of the filter element 2. The dirt collecting region 14 is radially expanded relative to the immediately adjoining housing wall of the filter base housing 4. At the axial center of the dirt collecting chamber 14, the filter base housing 4 and the outlet section 11 of the housing abut each other.

In radial direction, the dirt collecting region 14 is separated by a separation element 27 from the filter medium body 7 wherein the separation element 27 is embodied as a circumferentially extending conically embodied calming wall 27 which is part of the filter housing 3. The calming wall 27 forms the radially inwardly positioned boundary wall of the dirt collecting chamber 14. The calming wall 27 extends circumferentially all around and is positioned at a minimal distance relative to the inflow side or raw side of the filter medium body 7. In axial direction, the calming wall 27 extends from an end face section of the filter housing 3, in particular of the outlet section 11, at the level of the end disk 10 past the axial extension of the dirt collecting region 14. The axial length of the calming wall 27 amounts to, for example, at least one fourth of the axial total length of the filter element 2. The calming wall 27 provides for a flow calming action in this axial section in the receiving space 26 and reduces in this section the inflow into the filter medium body 7. The dirt collecting region 14 is in flow communication with the receiving space 26.

Due to the flow calming action and the larger radial extension of the dirt collecting region 14 in comparison to the immediately neighboring housing wall of the filter base housing 4, dirt particles can deposit in the dirt collecting region 14 and are subsequently discharged via the discharge valve 13.

The calming wall 27 is located axially adjacent to the open end disk 10 and extends in axial direction, beginning at the open end disk 10, across a partial region of the filter medium body 7.

The axially oppositely positioned side is provided with a further separation element 27a in the form of a separation film which is applied immediately onto the filter medium body 7. The separation film 27a extends, beginning at the closed end disk 9, in axial direction so that the calming wall 27 and the separation film 27a extend from oppositely positioned end faces axially in the direction toward the center of the filter medium body 7. The axial length of the calming wall 27 and of the separation film 27a is at least approximately of the same size. At the center between the two separation elements 27 and 27a, a partial section of the filter medium body 7 is provided which is free of separation elements and thus can immediately receive radially incoming flow of the raw fluid to be purified.

Both separation elements 27 and 27a provide for a flow calming action of the raw fluid flowing into the inflow space at the inflow side of the filter medium body so that it is possible that coarse dirt particles deposit in the annular space 14 and can be discharged via the discharge valve 13. Despite the separation elements 27 and 27a, the raw fluid can flow into the filter medium body 7 across its entire axial length and its entire inflow side. The calming wall 27 is positioned radially at a distance to the inflow side of the filter medium body 7 so that an annular space is formed between the calming wall 27 and the inflow side of the filter medium body into which the raw fluid can flow.

The filter medium body 7 is of a folded configuration wherein the longitudinal extension of the folds extends parallel to the longitudinal axis 15 of the filter element. In the region of the calming film 27a that is applied immediately onto the filter medium body 7 and, for example, is welded or glued to the filter medium body 7, the raw fluid can flow along the folds of the filter medium body 7, beginning at the partial section of the filter medium body without separation element, axially into the partial region which is covered by the separation film 27*a*. In this way, the filter medium body 7 is available for filtration of the raw fluid even in the region of the separation film 27*a*.

What is claimed is:

1. A filter module comprising:
    a filter housing elongated along and surrounding a central axis, the filter housing comprising:
        an inlet housing; and
        a filter base housing,
        wherein the inlet housing is configured to be attached to the filter base housing,
        an inflow duct having a lateral inflow opening extending through an radial outer wall of the inlet housing, the inflow duct extending into an interior of the filter housing;
    a filter element arranged inside the filter base housing, the filter element comprising:
        an annular filter medium body surrounding the central axis and having an open interior;
        a first end disk arranged on and closing off a first axial end of the annular filter medium body, the first end disk positioned adjacent to and axially spaced away from the lateral inflow opening;
        wherein an annular flow passage is formed by a radial spacing between the annular filter medium body and an inner side of a housing wall of the filter base housing;
    wherein the swirl device further comprises one or more guiding ribs arranged in the annular flow passage between an end face of the filter element and the inner side of the housing wall of the filter base housing;
    an annular displacement body arranged inside the filter base housing and positioned upstream of the filter element, the annular displacement body comprising:
        a radially outer circumferential wall having:
            an inflow continuation wall contacting against the inflow duct at the radial outer wall of the inlet housing proximate to the lateral inflow opening, the inflow continuation wall forming a wall portion of the inflow duct inside the filter housing;
        the radially outer circumferential wall further comprising:
            a first axial end arranged at and supported on the first end disk;
            a second axial end arrange opposite the first axial end of the displacement body and comprises an annular axial edge contour having a geometry that follows and contacts against an inner surface contour of the inlet housing, such that an interior of the annular displacement body is closed off by the first end disk and by the inner surface contour of the inlet housing;
        wherein the inflow duct inside the filter housing is at least partially formed by the inflow continuation wall and the radially outer circumferential wall of the annular displacement body, the inflow duct extending across the first end disk from a first radial side of the first end disk towards an opposite second radial side of the first end disk and curved to open into the annular flow passage radially surrounding the annular filter medium body at the opposite second radial side of the first end disk;
    wherein a cross-sectional area of the inlet duct reduces from the lateral inflow opening in a direction towards the annular flow passage, the reducing cross-sectional area accelerating air flow to swirl about the annular filter medium in the annular flow passage, forming a swirl device effecting pre-separation of contaminants in the air flow before entering the filter medium body.

2. The filter module according to claim 1, wherein
the annular displacement body is curved in a direction toward the annular flow passage arranged between an end face of the filter medium body and the inner side of the housing wall of the filter housing.

3. The filter module according to claim 2, wherein
the annular displacement body, the housing wall of the filter housing and the inflow continuation wall delimit together an air flow path from the inflow opening in the direction toward the annular flow passage.

4. The filter module according to claim 1, wherein
the first end disk of the filter element includes fastening elements formed as axial projections, projecting axially outward from the filter element;
wherein the annular displacement body includes fastening receptacles configured to receive and engage the fastening elements to fix or center the filter element relative to the annular displacement body in the filter housing.

5. The filter module according to claim 1, wherein
the one or more guiding ribs are arranged at the filter element.

6. The filter module according to claim 1, wherein
the one or more guiding ribs are arranged at the filter housing.

7. The filter module according to claim 1, wherein
the inflow opening is spaced radially outwards away from the central longitudinal axis.

8. The filter module according to claim 1, further comprising
a flow-tight separation element arranged at or adjacent to the filter medium body of the filter element,
wherein the flow-tight separation element extends across a partial surface of the filter medium body at the inflow side.

* * * * *